United States Patent
Wang et al.

(10) Patent No.: US 11,783,459 B2
(45) Date of Patent: Oct. 10, 2023

(54) METHOD AND DEVICE OF INVERSE TONE MAPPING AND ELECTRONIC DEVICE

(71) Applicant: PEKING UNIVERSITY SHENZHEN GRADUATE SCHOOL, Shenzhen (CN)

(72) Inventors: Ronggang Wang, Guangdong (CN); Chao Wang, Guangdong (CN); Wen Gao, Guangdong (CN)

(73) Assignee: PEKING UNIVERSITY SHENZHEN GRADUATE SCHOOL, Guangdong (CN)

( * ) Notice: Subject to any disclaimer, the term of this patent is extended or adjusted under 35 U.S.C. 154(b) by 526 days.

(21) Appl. No.: 16/975,485

(22) PCT Filed: Jun. 19, 2019

(86) PCT No.: PCT/CN2019/091874
§ 371 (c)(1),
(2) Date: Aug. 25, 2020

(87) PCT Pub. No.: WO2020/248294
PCT Pub. Date: Dec. 17, 2020

(65) Prior Publication Data
US 2023/0025557 A1    Jan. 26, 2023

(30) Foreign Application Priority Data
Jun. 10, 2019   (CN) .......................... 201910499995.3

(51) Int. Cl.
*G06T 5/00* (2006.01)
*G06T 5/20* (2006.01)
*G06T 5/50* (2006.01)

(52) U.S. Cl.
CPC ............... *G06T 5/009* (2013.01); *G06T 5/20* (2013.01); *G06T 5/50* (2013.01);
(Continued)

(58) Field of Classification Search
CPC . G06T 2207/20208; G06T 2207/20081; G06T 2207/20084; G06T 5/007;
(Continued)

(56) References Cited

U.S. PATENT DOCUMENTS 9,911,181 B2    3/2018   Pouli et al.
10,467,735 B2   11/2019  Pouli et al.
(Continued)

FOREIGN PATENT DOCUMENTS

CN    105850114 A    8/2016
CN    107545547 A    1/2018
(Continued)

OTHER PUBLICATIONS

C. Wang, Y. Zhao and R. Wang, "Deep Inverse Tone Mapping for Compressed Images," in IEEE Access, vol. 7, pp. 74558-74569, 2019, doi: 10.1109/ACCESS.2019.2920951.*
(Continued)

*Primary Examiner* — Li Liu
(74) *Attorney, Agent, or Firm* — Westman, Champlin & Koehler, P.A.

(57) ABSTRACT

Embodiments of the present application provide a method and a device of inverse tone mapping and an electronic device. The method includes: obtaining one or more low dynamic range images; performing a decomposition operation to the low dynamic range image to acquire a detail layer and a basic layer of the low dynamic range image; restoring the detail layer and the basic layer by using a predetermined first restoration network and a second restoration network to acquire restored detail layer and basic layer; and adjusting the restored detail layer and basic layer by using a predetermined fusion network to acquire an adjusted high dynamic range image. With the technical solution of the present application, the conversion from a low dynamic
(Continued)

range image to a high dynamic range image can be more robustly completed without complicated parameter settings.

9 Claims, 3 Drawing Sheets

(52) U.S. Cl.
 CPC ............... *G06T 2207/10024* (2013.01); *G06T 2207/20084* (2013.01); *G06T 2207/20192* (2013.01); *G06T 2207/20208* (2013.01); *G06T 2207/20221* (2013.01)

(58) Field of Classification Search
 CPC .......... H04N 1/58; G06V 10/60; G06V 10/82; G06V 10/56
 See application file for complete search history.

(56) References Cited

U.S. PATENT DOCUMENTS

| | | | | |
|---|---|---|---|---|
| 2007/0172118 A1* | 7/2007 | Pan | ........................... | H04N 1/58 382/254 |
| 2012/0257824 A1* | 10/2012 | Jang | ........................ | G06T 5/009 382/166 |
| 2017/0372461 A1 | 12/2017 | Kim et al. | | |
| 2018/0374202 A1* | 12/2018 | Cauvin | ................... | G06T 5/009 |
| 2020/0286213 A1* | 9/2020 | Unger | .................. | H04N 1/4072 |
| 2021/0166360 A1* | 6/2021 | Kim | ......................... | G06T 5/009 |

FOREIGN PATENT DOCUMENTS

| | | |
|---|---|---|
| CN | 107949864 A | 4/2018 |
| CN | 109785263 A | 5/2019 |

OTHER PUBLICATIONS

Ronneberger, Olaf, Philipp Fischer, and Thomas Brox. "U-net: Convolutional networks for biomedical image segmentation." Medical Image Computing and Computer-Assisted Intervention—MICCAI,Oct. 5-9, 2015.*

Zhang, Erhu, Huiyun Yang, and Maiping Xu. "A novel tone mapping method for high dynamic range image by incorporating edge-preserving filter into method based on retinex." Applied Mathematics & Information Sciences 9.1 (2015): 411-417.*

International Search report for corresponding International Application No. PCT/CN2019/091874, filed Jun. 19, 2019.

* cited by examiner

METHOD AND DEVICE OF INVERSE TONE MAPPING AND ELECTRONIC DEVICE

CROSS REFERENCE TO RELATED APPLICATION

This Application is a Section 371 National Stage Application of International Application No. PCT/CN2019/091874, filed Jun. 19, 2019, and claims priority to Chinese Patent Application No. CN201910499995.3, filed Jun. 10, 2019, entitled "a method and a device of inverse tone mapping and an electronic device", the content of which is incorporated herein by reference.

TECHNICAL FIELD

The present application relates to the technical field of digital image processing, and more particularly to a method and a device of inverse tone mapping and an electronic device.

BACKGROUND

In the field of digital image processing, if an ordinary image is to be displayed on a High Dynamic Range (HDR) display device, it cannot provide sufficient accuracy, so it is necessary to restore HDR information from the ordinary image. This process is called inverse tone mapping. Taking the application of inverse tone mapping technology in 4K TV technology as an example, since most media resources are still stored in a low dynamic range, the inverse tone mapping technology being used to convert media resources from low dynamic range to high dynamic range is an important part of 4K TV technology.

In the prior art, a parametric model is proposed to complete the conversion of low dynamic range images to high dynamic range images through the parametric model. This method is mainly to expand the brightness in order to display good vision effect on the high dynamic range display. However, the existing method cannot completely restore lost information in the low dynamic range image, and requires complicated parameter settings. In addition, the current inverse tone mapping methods are mostly for high-quality low dynamic range images. However, in practice, most of media resources are stored in a lossy compressed format during transmission, which will cause compression artifacts, and the compression artifacts have a serious effect on the results of inverse tone mapping. Based on the existing technology, there is a need to provide an inverse tone mapping scheme that can robustly complete the conversion of low dynamic range images to high dynamic range images.

SUMMARY

In view of above, an object of the present application is to provide a method and a device of inverse tone mapping, and electronic device to solve the problem of poor conversion effect of a low dynamic range image to a high dynamic range image existing in the prior art.

In order to solve the above technical problems, the embodiments of the present application are implemented as follows:

Embodiments of the present application provide a method of inverse tone mapping, the method including steps of:
acquiring one or more low dynamic range images;
performing a decomposition operation to the low dynamic range image to acquire a detail layer and a basic layer of the low dynamic range image;
restoring the detail layer and the basic layer by using a predetermined first restoration network and a second restoration network to acquire restored detail layer and basic layer; and
adjusting the restored detail layer and basic layer by using a predetermined fusion network to acquire an adjusted high dynamic range image.

Optionally, the step of acquiring one or more low dynamic range images includes step of:
compressing an original image to acquire a compressed low dynamic range image.

Optionally, the step of performing a decomposition operation to the low dynamic range image to acquire a detail layer and a basic layer of the low dynamic range image comprises step of:
performing a decomposition operation to the low dynamic range image based on the Retinex theory to acquire the detail layer and the basic layer of the low dynamic range image.

Optionally, the step of performing a decomposition operation to the low dynamic range image based on the Retinex theory to acquire the detail layer and the basic layer of the low dynamic range image specifically includes step of:
performing edge-preserving filtering to the low dynamic range image, and using the image acquired after the edge-preserving filtering as the basic layer of the low dynamic range image; and calculating a difference between the low dynamic range image and the basic layer image, and the image acquired after the difference being used as the detail layer of the low dynamic range image.

Optionally, the first restoration network is a residual network and the second first restoration network is a U-Net network; the step of restoring the detail layer and the basic layer by using a predetermined first restoration network and a predetermined second restoration network includes step of:
restoring the detail layer by using the residual network and restoring the basic layer by using the U-Net network.

Optionally, the detail layer contains high frequency components and compression artifacts of the low dynamic range image, and the basic layer contains low frequency components of the low dynamic range image; the step of restoring the detail layer by using the residual network and restoring the basic layer by using the U-Net network includes step of:
restoring the high frequency components by using the residual network to remove the compression artifacts, and restoring the low frequency components by using the U-Net network.

Optionally, the high frequency components include edges and contours, and the low frequency components include color information and structural information.

Optionally, the fusion network uses a residual network.

Embodiments of the present application further provide a device of inverse tone mapping, including:
an acquisition module, configured to acquire one or more low dynamic range images;
a decomposition module, configured to perform a decomposition operation to the low dynamic range image to acquire a detail layer and a basic layer of the low dynamic range image;
a restoring module, configured to respectively recover the detail layer and the basic layer by using a predetermined first restoration network and a predetermined second restoration network to acquire restored detail layer and basic layer;

an adjustment module, configured to adjust the restored detail layer and basic layer by using a predetermined fusion network to acquire an adjusted high dynamic range image.

Optionally, the acquisition module specifically configured to compress an original image to acquire a compressed low dynamic range image.

Optionally, the decomposition module specifically configured to perform a decomposition operation to the low dynamic range image based on the Retinex theory to acquire the detail layer and the basic layer of the low dynamic range image.

Optionally, the decomposition module further configured to perform edge-preserving filtering to the low dynamic range image, and to use the image acquired after the edge-preserving filtering as the basic layer of the low dynamic range image; and to calculate a difference between the low dynamic range image and the basic layer image, and the image acquired after the difference being used as the detail layer of the low dynamic range image.

Optionally, the first restoration network is a residual network and the second first restoration network is a U-Net network; and the restoring module specifically configured to restore the detail layer by using the residual network and to restore the basic layer by using the U-Net network.

Optionally, the detail layer contains high frequency components and compression artifacts of the low dynamic range image, and the basic layer contains low frequency components of the low dynamic range image; and the restoring module further configured to restore the high frequency components by using the residual network to remove the compression artifacts, and to restore the low frequency components by using the U-Net network.

Optionally, the high frequency components include edges and contours, and the low frequency components include color information and structural information.

Embodiments of the present application further provide an electronic device, comprising: a storage device, a processor, and a computer program stored on the memory and executable on the processor, wherein the processor implements the method of above mentioned when the processor executes the program.

The above at least one technical solution adopted in the embodiments of the present application can achieve the following beneficial effects: in the present application, by acquiring one or more low dynamic range images, and performing a decomposition operation to the low dynamic range image to acquire a detail layer and a basic layer of the low dynamic range image; and then restoring the detail layer and the basic layer by using a predetermined first restoration network and a predetermined second restoration network to acquire restored detail layer and basic layer; and then adjusting the restored detail layer and basic layer by using a predetermined fusion network to acquire an adjusted high dynamic range image. With the technical solution of the present application, the conversion from a low dynamic range image to a high dynamic range image can be more robustly completed without complicated parameter settings.

BRIEF DESCRIPTION OF THE DRAWINGS

In order to explain the embodiments of the present invention more clearly, a brief introduction regarding the accompanying drawings that need to be used for describing the embodiments of the present invention or the prior art is given below; it is obvious that the accompanying drawings described as follows are only some embodiments of the present invention, for those skilled in the art, other drawings can also be obtained according to the current drawings on the premise of paying no creative labor.

DETAILED DESCRIPTION

In order to enable those skilled in the art to better understand the technical solutions in the present application, the technical solutions in the embodiments of the present application will be described clearly and completely in conjunction with the drawings in the embodiments of the present application. Obviously, the described embodiments are only a part of the embodiments of the present application, but not all the embodiments. Based on the embodiments of the present application, all other embodiments acquired by those of ordinary skill in the art without creative work shall fall within the scope of protection of the present application.

In practical applications, since the content of Standard Dynamic Range (SDR) cannot be displayed on an HDR display device with sufficient accuracy, and the current HDR content is in short supply, there is an urgent need for a technology that can convert SDR content to HDR content, inverse tone mapping technology came into being. At present, most of the media resources (such as images) are still stored in a low dynamic range, and in order to facilitate the storage and transmission of images, ordinary images need to be stored in a lossy compressed format, which also introduces compression artifacts, such as block artifacts, band artifacts and ringing effects.

Most of methods of the current inverse tone mapping are aimed at high-quality low dynamic range images, that is, the lossy compressed or uncompressed low dynamic range images. The traditional method of inverse tone mapping is usually to propose a parameter model, through the parameter model to complete the conversion of low dynamic range images to high dynamic range images. This traditional method is mainly to expand the brightness in order to display a good visual effect on a high dynamic range display. However, this method has many drawbacks, it cannot fully restore the information lost in the low dynamic range image, and it also requires complicated parameter settings, which is also very difficult for ordinary users. In addition, ordinary images are stored in a lossy compressed format during transmission, which results in the generation of compression artifacts, which have a serious impact on the results of inverse tone mapping. If the compression artifacts are first removed and then using the inverse tone mapping, the result will be too blurry. If removing the compression artifacts on the basis of the inverse tone mapping, the artifacts will be enhanced due to the inverse tone mapping and difficult to remove.

Therefore, for low quality and low dynamic range images, that is, the low dynamic range images stored in a lossy compression format, it is necessary to provide an inverse tone mapping scheme that can restore the information lost during compression of the low dynamic range image and simultaneously remove compression artifacts, and more robustly complete the conversion of low dynamic range images to high dynamic range images. The following embodiments of the present application may be performed on a low dynamic range image as a processing object, especially on a lossy compressed low dynamic range image (that is, a low quality and low dynamic range image) as a processing object. Of course, using the lossy compressed low dynamic range image as the processing object is only an application scenario of the embodiment of the present application, and cannot constitute a limitation on the application range of the embodiment of the present application.

Figure 1:
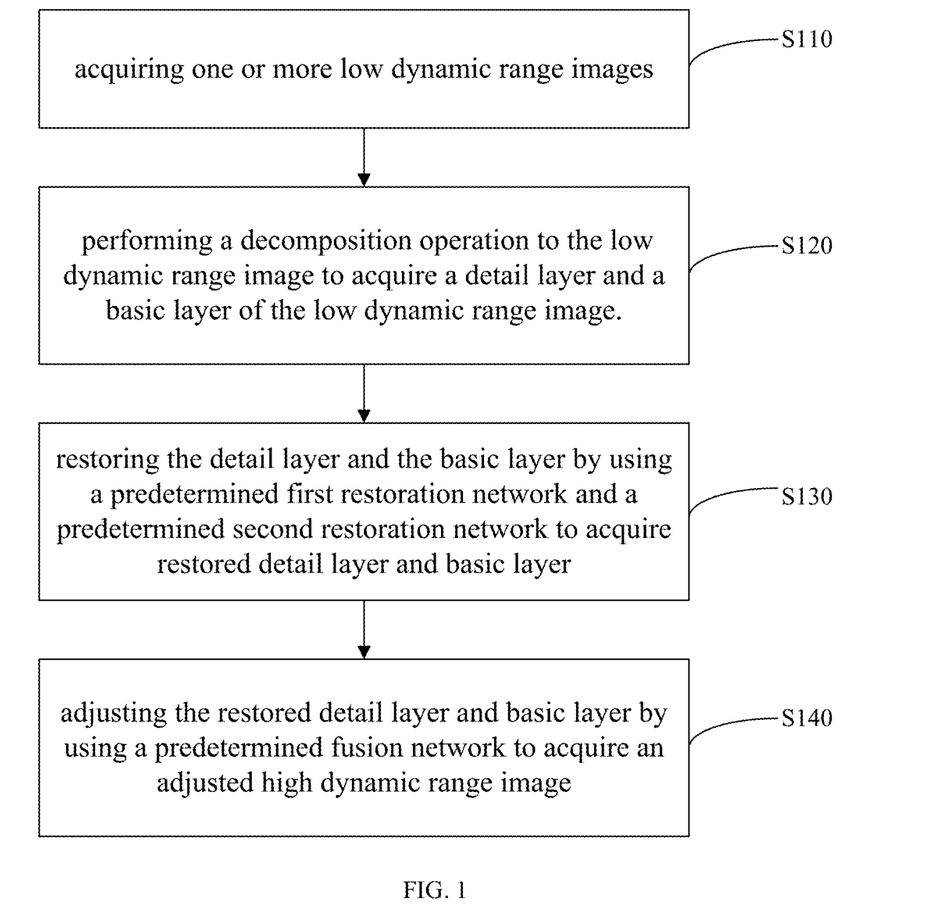
FIG. 1 is a schematic flowchart of a method of inverse tone mapping provided by an embodiment of the present application.

FIG. 1 is a schematic flowchart of a method of inverse tone mapping provided by an embodiment of the present application. The method may specifically include the following steps:

Step S110, acquiring one or more low dynamic range images.

In one or more embodiments of the present application, the low dynamic range image is a processing object of inverse tone mapping, and acquiring one or more low dynamic range images may be regarded as acquiring one or more images to be processed. According to the foregoing, the image to be processed in the embodiment of the present application may be any low dynamic range image, including but not limited to: uncompressed low dynamic range image, lossless compressed low dynamic range image and lossy compressed low dynamic range image. Considering that most existing media resources are stored as lossy compressed images in order to facilitate storage and transmission, and the lossy compression method causes the generation of compression artifacts, so compared with other low dynamic range images, the lossy compressed low dynamic range images also need to consider the impact of compression artifacts on inverse tone mapping.

In a specific embodiment, the compressed low dynamic range image may be acquired by compressing the original images, where the compression may be lossy compression, and the original images may include uncompressed low dynamic range images, lossless compression low dynamic range images or high dynamic range images, and so on. Preferably, the following embodiments of the present application are based on lossy compressed low dynamic range images, that is, regarding to the low quality and low dynamic range images as images to be processed.

It is noted that, in the embodiment of the present application, the low dynamic range image can be considered as an image with a pixel value between 0-255, and the high dynamic range image can be considered as an image with a pixel value between $0$-$16\times10^5$.

Step S120, performing a decomposition operation to the low dynamic range image to acquire a detail layer and a basic layer of the low dynamic range image.

In one or more embodiments of the present application, continuing the content of the above embodiments, after acquiring a low quality and low dynamic range image through compression processing, a decomposition operation may be performed on the acquired low dynamic range image to acquire the detail layer and the basic layer of the low dynamic range image. In the embodiments of the present application, the following methods may be used to perform decomposition operations on low dynamic range images, and the method may include the following processes:

Performing a decomposition operation to the low dynamic range image based on the Retinex theory to acquire the detail layer and the basic layer of the low dynamic range image.

Specifically, performing edge-preserving filtering to the low dynamic range image, and using the image obtained after the edge-preserving filtering as the basic layer of the low dynamic range image; and calculating a difference between the low dynamic range image and the basic layer image, and the image obtained after the difference being used as the detail layer of the low dynamic range image.

The Retinex theory is a theory widely used in digital image processing, it believes that digital images can be decomposed into detail layers and basic layers, and the two are independent of each other.

Further, considering that compression artifacts are caused by excessive compression of the high frequency components, which mainly exist in the high frequency components, the low dynamic range image is decomposed into high frequency and low frequency parts by using the Retinex theory, that is, decomposed into the detail layer and the basic layer; among them, the detail layer contains the high frequency components and compression artifacts of the low dynamic range image, and the basic layer contains the low frequency components of the low dynamic range image.

Step S130, restoring the detail layer and the basic layer by using a predetermined first restoration network and a predetermined second restoration network to acquire restored detail layer and basic layer.

In one or more embodiments of the present application, since the detail layer contains high frequency components and compression artifacts of the low dynamic range image, the high frequency components may include texture information of the low dynamic range image, such as edges and contours, and so on. Therefore, the detail layer needs to ensure the integrity of its structure, reduce the loss of information, and avoid down-sampling, therefore, a residual network with a constant feature map size can be used as the restoration network for the detail layer.

For the basic layer, it contains the low frequency components of the low dynamic range image, and the low frequency components contain a lot of color information and structural information (such as the shape of the object), etc. This part of information being used to restore the overexposed area, under-exposed area and color mapping has an important role. In order to extract sufficient features, it is necessary to use multi-scale information to restore the object structure, so U-Net network can be used as the restoration network of the basic layer.

Further, restoring the detail layer by using the residual network, and restoring the basic layer by using the U-Net network; herein, the first restoration network is the residual network and the second restoration network is the U-Net network.

According to the content of the foregoing embodiment, the detail layer contains high frequency components and compression artifacts of the low dynamic range image, and the basic layer contains low frequency components of the low dynamic range image; therefore, the residual layer is used to restore the detail layer and the U-Net network is used to restore the basic layer, which can include the following:

restoring the high frequency components by using the residual network to remove the compression artifacts, and restoring the low frequency components by using the U-Net network.

Figure 2:
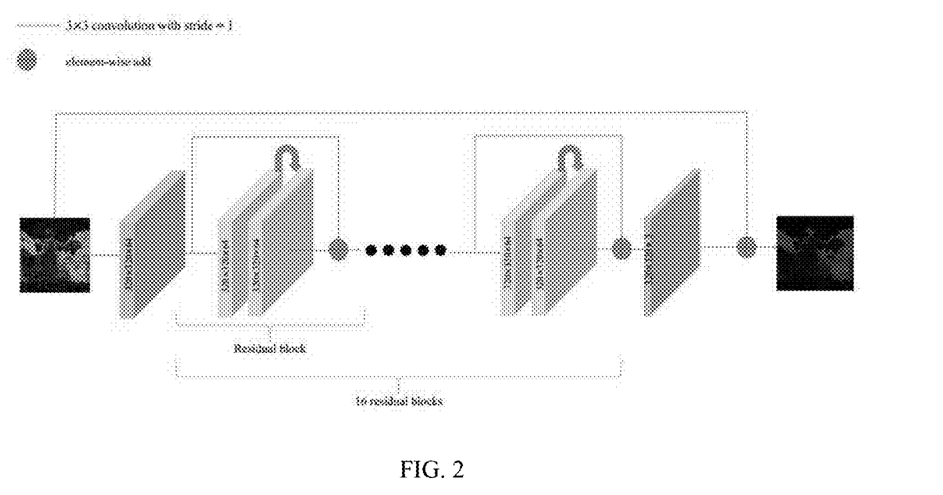
FIG. 2 is a structural schematic view of a residual network provided by an embodiment of the present application.
Figure 3:
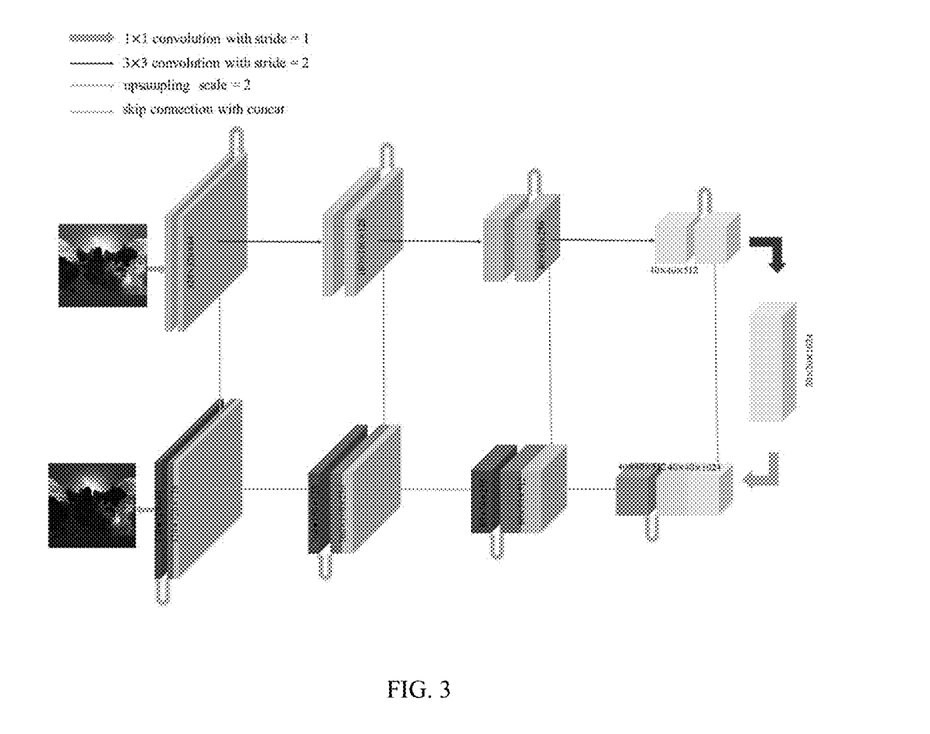
FIG. 3 is a structural schematic view of a U-net network provided by an embodiment of the present application.

The structure of the residual network and the U-Net network will be described in detail below with reference to the drawings. As shown in FIGS. 2 to 3, which show structural schematic views of the residual network and the U-Net network provided by the embodiments of the present application, and includes the following:

The residual network includes one or more convolution layers on both sides and multiple residual blocks in the middle, and each of the residual blocks contains a first convolution layer, a second activation layer, and a third convolution layer and a fourth activation layer arranged in sequence; among then, before the fourth activation layer further includes: performing an addition operation on an input image of the residual block and an output image of the third convolution layer.

Further, in an embodiment of the present application, the residual network may include 2 convolution layers on the front and rear sides and 16 residual blocks in the middle. The activation layer in the residual block uses the SELU activation function. The size of the convolution kernel of each convolution layer in the residual network is 3*3, and the step size is 1, except that the number of feature channels of the last convolution layer (that is, the rightmost convolution layer in FIG. 2) is 3, the number of feature channels of the remaining layers are 64. In practical applications, in order to keep the size of the feature map unchanged, edge filling can be done in a mirror-symmetrical manner.

The U-Net network includes multiple convolution blocks and deconvolution blocks. The convolution blocks are located in front of the deconvolution blocks. The convolution block includes a convolution layer, an activation layer, and a convolution layer and an activation layer arranged in sequence; in order to avoid chessboard artifacts, in the deconvolution block, first up-sampling to expand the resolution of the feature map, and then performing the convolution operation. The deconvolution block contains an up-sampling layer and a convolution layer and an activation layer arranged in sequence. At the same time, in order to accelerate the convergence speed, batch normalization operations are added to each layer, and in order to make full use of low level features, there are jump links between the corresponding up and down sampling layers Further, in an embodiment of the present application, the U-Net network includes 5 convolution blocks and 4 deconvolution blocks, that is, the U-Net network may include a total of 9 layers; where each of the first four convolution blocks contains a convolution layer with a size of 1*1 and a step size of 1, an activation layer, a convolution layer with a size of 3*3 and a step size of 2 and an activation layer arranged in sequence, the number of feature channels of the first four convolution blocks are 64, 128, 256, and 512 respectively; the fifth convolution block contains a convolution layer with a size of 3*3 and a step size of 1, an activation layer, a convolution layer with a size of 3*3 and a step size of 1 and an activation layer arranged in sequence, and the number of feature channels of the fifth convolution block is 1024. Each of the deconvolution blocks contain an up-sampling layer, a convolution layer with a size of 3*3 and a step size of 1 and an activation layer arranged in sequence, and the number of feature channel of the deconvolution blocks are 512, 256, 128, 64, 3, respectively.

In the embodiment of the present application, the up-sampling adopts two-line up-sampling, and the resolution of the feature map can be enlarged through the up-sampling.

Step S140, adjusting the restored detail layer and basic layer by using a predetermined fusion network to acquire an adjusted high dynamic range image.

Continuing the above embodiment, after by using two different restoration networks to restore the high frequency components and the low frequency components respectively, the restored detail layer and the basic layer can be acquired, and finally the predetermined fusion network is further used to adjust the restored detail layer and the basic layer to acquire the final restored high dynamic range image.

Figure 4:
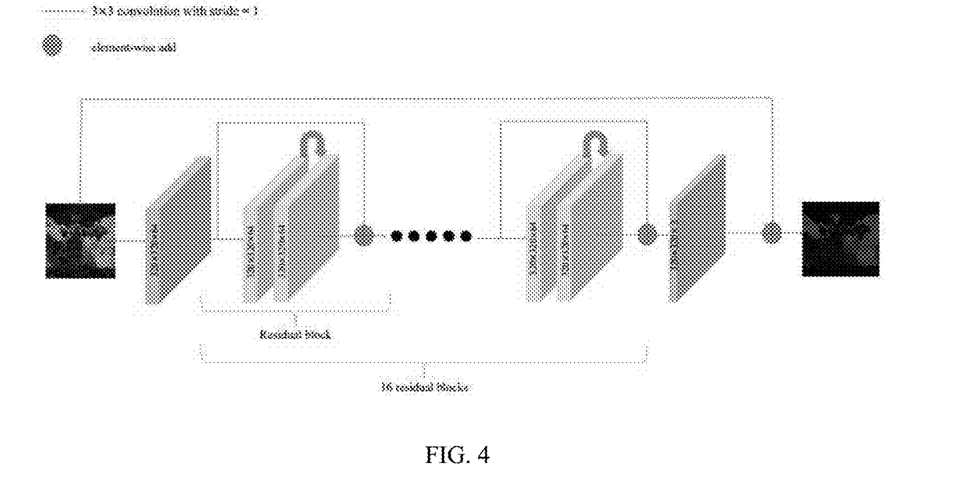
FIG. 4 is a structural schematic view of fusion network provided by an embodiment of the present application.

Further, the fusion network may use a residual network, and the structure of the fusion network is similar to the structure of the first restoration network (that is, the detail layer restoration network), but in practical applications, the fusion network may contain only 8 residual blocks. Refer to FIG. 4, which shows a structural schematic view of a fusion network provided by an embodiment of the present application. Since the fusion network and the first restoration network both use the residual network, and the structures of the two are similar, the structure of the fusion network will not be repeated herein. For the structure of the fusion network, can refer to the above description of the structure of the first restoration network.

Based on the above embodiments of the present application, considering that compression artifacts are caused by excessive compression of high frequency components, which mainly exist in the high frequency components, therefore, the low dynamic range image is decomposed into high-frequency components (ie, the detail layer) and the low-frequency part (ie, the basic layer) by the Retinex theory. Since the detail layer contains high frequency components of the image (such as edges and contours) and compression artifacts, it is mainly responsible for edge retention and removal of compression artifacts; while the basic layer contains low frequency components of the image (such as color information and structural information), it is mainly responsible for the recovery of overexposure and underexposure missing information and color mapping, so for the above two different component information, two different networks are used to restore the detail layer and the basic layer, and finally use a fusion network is used to further adjust results of the first two networks to achieve the restoration of high dynamic range image. The present application can not only restore the information lost in the low dynamic range image, but also take into account the restoration of different missing information, such as: overexposure areas, underexposure areas, color information and object structure, etc., and can also remove compression artifacts at the same time, and the conversion of compressed low dynamic range images to high dynamic range images is more robustly completed.

Figure 5:
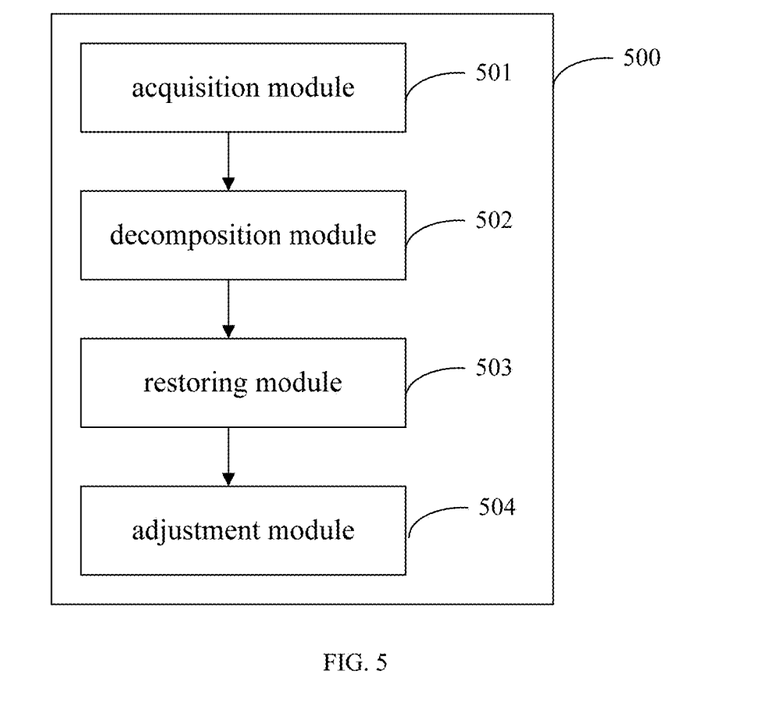
FIG. 5 is a structural schematic view of a device of inverse tone mapping provided by an embodiment of the present application.

Based on the same idea, an embodiment of the present application further provides a device of inverse tone mapping. As shown in FIG. 5, a device of inverse tone mapping is provided according to an embodiment of the present application. The device 500 mainly includes: an acquisition module 501, configured to acquire one or more low dynamic range images;

a decomposition module 502, configured to perform a decomposition operation to the low dynamic range image to acquire a detail layer and a basic layer of the low dynamic range image;

a restoring module 503, configured to respectively recover the detail layer and the basic layer by using a predetermined first restoration network and a predetermined second restoration network to acquire restored detail layer and basic layer;

an adjustment module 504, configured to adjust the restored detail layer and basic layer by using a predetermined fusion network to acquire an adjusted high dynamic range image.

According to an embodiment of the present application, in the device, the acquisition module 501 specifically configured to compress an original image to acquire a compressed low dynamic range image.

According to an embodiment of the present application, in the device, the decomposition module 502 specifically configured to perform a decomposition operation to the low dynamic range image based on the Retinex theory to acquire the detail layer and the basic layer of the low dynamic range image.

According to an embodiment of the present application, in the device, the decomposition module 502 further configured to perform edge-preserving filtering to the low dynamic range image, and to use the image obtained after the edge-preserving filtering as the basic layer of the low dynamic range image; and to calculate a difference between the low dynamic range image and the basic layer image, and the image obtained after the difference being used as the detail layer of the low dynamic range image.

According to an embodiment of the present application, in the device, the first restoration network is a residual network and the second first restoration network is a U-Net network; and the restoring module 503 specifically configured to restore the detail layer by using the residual network and to restore the basic layer by using the U-Net network.

According to an embodiment of the present application, in the device, the detail layer contains high frequency components and compression artifacts of the low dynamic range image, and the basic layer contains low frequency components of the low dynamic range image; and the restoring module 503 further configured to restore the high frequency components by using the residual network to remove the compression artifacts, and to restore the low frequency components by using the U-Net network.

According to an embodiment of the present application, in the device, the high frequency components comprise edges and contours, and the low frequency components comprise color information and structural information.

Embodiments of the present application also provide an electronic device, including a storage device, a processor, and a computer program stored on the storage device and executable on the processor. When the processor executes the program, the above method of inverse tone mapping is implemented.

The foregoing describes specific embodiments of the present application. Other embodiments are within the scope of the following claims. In some cases, the actions or steps recited in the claims may be performed in a different order than in the embodiments and still achieve the desired results. In addition, the processes depicted in the drawings do not necessarily require the particular order shown or sequential order to achieve the desired results. In some embodiments, multitasking and parallel processing are also possible or may be advantageous.

The embodiments in the present application are described in a progressive manner. The same or similar parts between the embodiments can be referred to each other, and each embodiment focuses on the differences from other embodiments. In particular, for the embodiments of the device and the electronic device, since they are basically similar to the method embodiments, the description is relatively simple. For the related parts, please refer to the description of the method embodiments.

The device, the electronic device and the method provided in the embodiments of the present application correspond to each other. Therefore, the device and the electronic device also have beneficial technical effects similar to the corresponding method. Since the beneficial technical effects of the method have been described in detail above, therefore, the beneficial technical effects of the corresponding devices and electronic equipment will not be described in detail herein.

The present application is described with reference to flowcharts and/or block diagrams of methods, devices (systems), and computer program products according to embodiments of the present application. It should be understood that each flow and/or block in the flowchart and/or block diagram and a combination of the flow and/or block in the flowchart and/or block diagram can be implemented by computer program instructions. These computer program instructions can be provided to the processor of a general-purpose computer, special-purpose computer, embedded processing machine, or other programmable data processing device to produce a machine that enables the generation of instructions executed by the processor of the computer or other programmable data processing device A device for realizing the functions specified in one block or multiple blocks of one flow or multiple flows of a flowchart and/or one block or multiple blocks of a block diagram.

It should also be noted that the terms "include", "contain" or any other variant thereof are intended to cover non-exclusive inclusion, so that a process, method, commodity or device that includes a series of elements includes not only those elements, but also includes other elements not explicitly listed, or include elements inherent to this process, method, commodity, or equipment. Without more restrictions, the element defined by the sentence "include one . . . " does not exclude that there are other identical elements in the process, method, commodity or equipment that includes the element.

This description can be described in the general context of computer-executable instructions executed by a computer, such as a program module. Generally, program modules include routines, programs, objects, components, data structures, etc. that perform specific tasks or implement specific abstract data types. The description may also be practiced in distributed computing environments in which tasks are performed by remote processing devices connected through a communication network. In a distributed computing environment, program modules may be located in local and remote computer storage media including storage devices.

The above description of the disclosed embodiments enables those skilled in the art to implement or use the present application. Various modifications to these embodiments will be apparent to those skilled in the art, and the general principles defined herein can be implemented in other embodiments without departing from the spirit and scope of the present application. Therefore, the present application will not be limited to the embodiments shown herein, but should conform to the widest scope consistent with the principles and novel features disclosed in the present application.

What is claimed is:

1. A method of inverse tone mapping, comprising steps of:
acquiring one or more low dynamic range images;
performing a decomposition operation to the one or more low dynamic range images to acquire a detail layer and a basic layer of the low dynamic range image;
restoring the detail layer and the basic layer by using a predetermined first restoration network and a predetermined second restoration network to acquire restored detail layer and basic layer, respectively; and
adjusting the restored detail layer and basic layer by using a predetermined fusion network to acquire an adjusted high dynamic range image;

wherein the first restoration network is a residual network and the second first restoration network is a U-Net network;

wherein the residual network comprises one or more convolution layers on both sides and multiple residual blocks in the middle, and each of the residual blocks contains a first convolution layer, a second activation layer, and a third convolution layer and a fourth activation layer arranged in sequence; and before the fourth activation layer further comprises: performing an addition operation on an input image of the residual block and an output image of the third convolution layer; and wherein the U-Net network comprises multiple convolution blocks and deconvolution blocks, the multiple convolution blocks are located in front of the multiple deconvolution blocks, and each of the multiple convolution block comprises a convolution layer, an activation layer, and a convolution layer and an activation layer arranged in sequence, and in each of the multiple deconvolution blocks, first up-sampling to expand the resolution of the a feature map, and then performing the a convolution operation; each of the multiple deconvolution blocks contains an up- sampling layer and a convolution layer and an activation layer arranged in sequence.

2. The method according to claim 1, wherein the step of acquiring one or more low dynamic range images comprises step of:

compressing an original image to acquire a compressed low dynamic range image.

3. The method according to claim 2, wherein the step of performing a decomposition operation to the low dynamic range image to acquire a detail layer and a basic layer of the low dynamic range image comprises step of:

performing a decomposition operation to the low dynamic range image based on the Retinex theory to acquire the detail layer and the basic layer of the low dynamic range image.

4. The method according to claim 3, wherein the step of performing a decomposition operation to the low dynamic range image based on the Retinex theory to acquire the detail layer and the basic layer of the low dynamic range image specifically comprises step of:

performing edge-preserving filtering to the low dynamic range image, and using the image acquired after the edge-preserving filtering as the basic layer of the low dynamic range image; and calculating a difference between the low dynamic range image and the basic layer image, and the image acquired after the difference being used as the detail layer of the low dynamic range image.

5. The method according to claim 1, wherein the step of restoring the detail layer and the basic layer by using a predetermined first restoration network and a predetermined second restoration network comprises step of:

restoring the detail layer by using the residual network and restoring the basic layer by using the U-Net network.

6. The method according to claim 5, wherein the detail layer contains high frequency components and compression artifacts of the low dynamic range image, and the basic layer contains low frequency components of the low dynamic range image; the step of restoring the detail layer by using the residual network and restoring the basic layer by using the U-Net network comprises step of:

restoring the high frequency components by using the residual network to remove the compression artifacts, and restoring the low frequency components by using U-Net network.

7. The method according to claim 6, wherein the high frequency components comprise edges and contours, and the low frequency components comprise color information and structural information.

8. The method according to claim 1, wherein the fusion network uses a residual network.

9. An electronic device, comprising: a storage device, a processor, and a computer program stored on the memory and executable on the processor, wherein when the processor executes the program the processor implements steps as following:

acquiring one or more low dynamic range images;

performing a decomposition operation to the one or more low dynamic range images to acquire a detail layer and a basic layer of the low dynamic range image;

restoring the detail layer and the basic layer by using a predetermined first restoration network and a predetermined second restoration network to acquire restored detail layer and basic layer, respectively; and adjusting the restored detail layer and basic layer by using a predetermined fusion network to acquire an adjusted high dynamic range image;

wherein the first restoration network is a residual network and the second first restoration network is a U-Net network;

wherein the residual network comprises one or more convolution layers on both sides and multiple residual blocks in the middle, and each of the residual blocks contains a first convolution layer, a second activation layer, and a third convolution layer and a fourth activation layer arranged in sequence; and before the fourth activation layer further comprises: performing an addition operation on an input image of the residual block and an output image of the third convolution layer; and wherein the U-Net network comprises multiple convolution blocks and deconvolution blocks, the multiple convolution blocks are located in front of the multiple deconvolution blocks, and each of the multiple convolution block comprises a convolution layer, an activation layer, and a convolution layer and an activation layer arranged in sequence, and in each of the multiple deconvolution blocks, first up-sampling to expand the resolution of a feature map, and then performing a convolution operation; each of the multiple deconvolution blocks contains an up-sampling layer and a convolution layer and an activation layer arranged in sequence.

* * * * *